United States Patent [19]

Moriyama et al.

[11] Patent Number: 4,528,552
[45] Date of Patent: Jul. 9, 1985

[54] TRAVEL LOCUS DISPLAY DEVICE

[75] Inventors: Masakazu Moriyama, Toyota; Takao Saito, Aichi, both of Japan

[73] Assignee: Toyota Jidosha Kogyo Kabushiki Kaisha, Toyota, Japan

[21] Appl. No.: 386,760

[22] Filed: Jun. 9, 1982

[30] Foreign Application Priority Data

Jun. 15, 1981 [JP] Japan .................................. 56-91965

[51] Int. Cl.³ .................... G08B 25/00; G08G 1/12
[52] U.S. Cl. ............................. 340/525; 340/286 M;
340/724; 340/995
[58] Field of Search ............. 340/525, 720, 721, 724,
340/728, 798, 286 R, 286 M, 365 R, 994, 995;
40/534, 361, 363, 382

[56] References Cited

U.S. PATENT DOCUMENTS 4,024,493  5/1977  Ingels .............................. 340/286 M
4,312,577  1/1982  Fitzgerald ....................... 340/286 M

FOREIGN PATENT DOCUMENTS 0040948  3/1980  Japan .............................. 340/286 M Primary Examiner—Donnie L. Crosland
Attorney, Agent, or Firm—Cushman, Darby & Cushman

[57] ABSTRACT

A travel locus display device has a display unit such as a CRT display to display a start point and a destination point of a vehicle and a travel locus of the vehicle from the start point to the destination point on a coordinate display area of a display screen of the display unit. The display screen is divided into four quadrants, one of which is selected as a display quadrant to which the destination point belongs. The display quadrant is displayed over an entire area of the coordinate display area.

8 Claims, 9 Drawing Figures

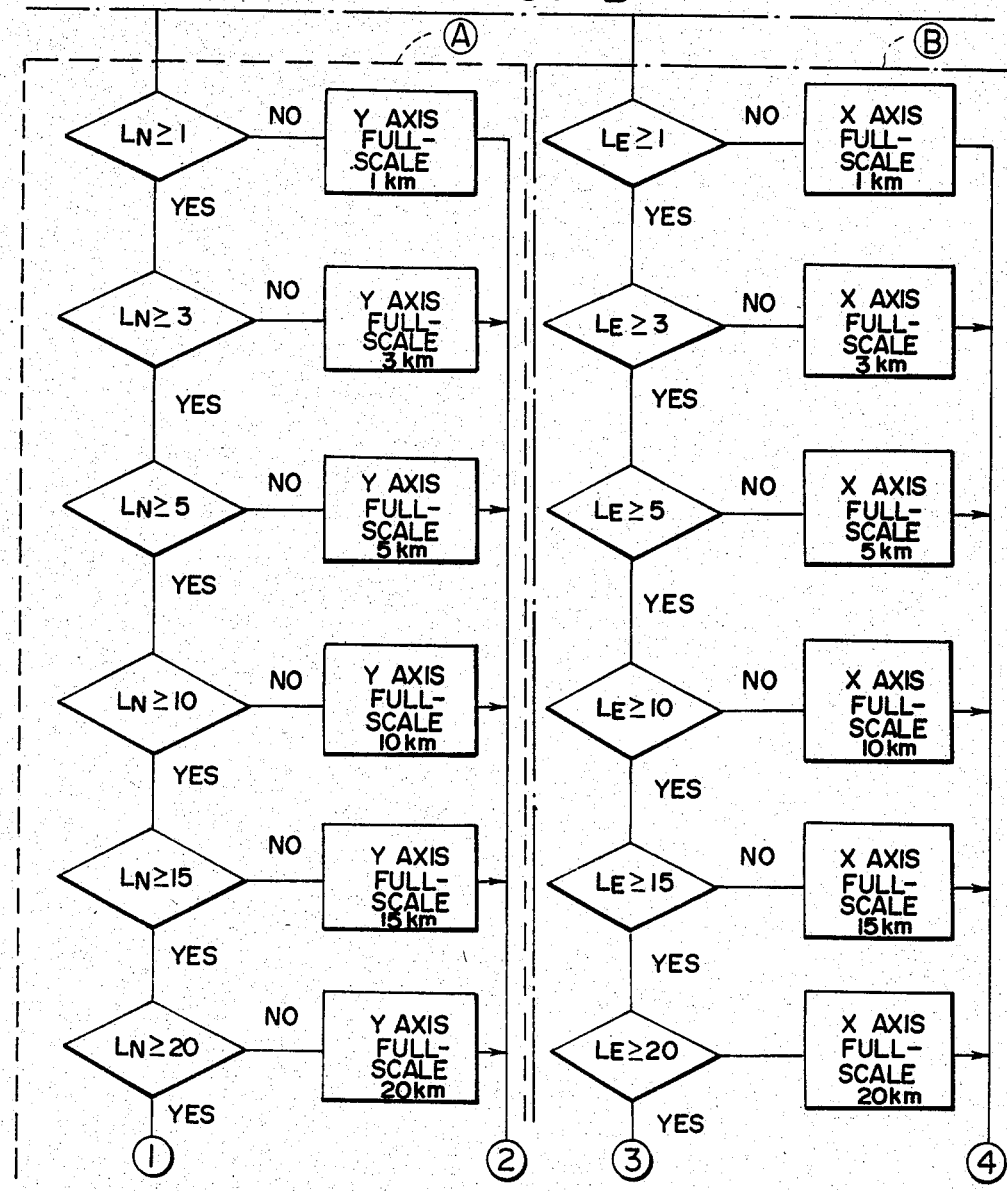

TRAVEL LOCUS DISPLAY DEVICE

BACKGROUND OF THE INVENTION (1) Field of the Invention

The present invention relates to a travel locus display device which displays a travel locus of a vehicle together with a destination point.

(2) Description of the Prior Art

A travel locus display device has a display such as a CRT for displaying a start point, a travel locus of a vehicle and a destination point on a coordinate of a display screen.

In a prior art travel locus display device, an area on the display screen on which coordinates are displayed (hereinafter referred to as an coordinate display area) has a coordinate origin at a center thereof and is divided into four quadrants.

However, in displaying the travel locus of the vehicle, only one of the quadrants is usually used. Accordingly, it has not been possible to display the travel locus of the vehicle on an entire coordinate display area in an enlarged manner to provide an exact and easy-to-observe display.

SUMMARY OF THE INVENTION

It is an object of the present invention to provide a travel locus display device which allows effective utilization of an entire coordinate display area to display an exact travel locus of a vehicle.

BRIEF DESCRIPTION OF THE DRAWINGS

FIGS. 4, 4a, 4b, 5, 6 and 7 illustrate operation of the embodiment.

DETAILED DESCRIPTION OF THE PREFERRED EMBODIMENT

Figure 1:
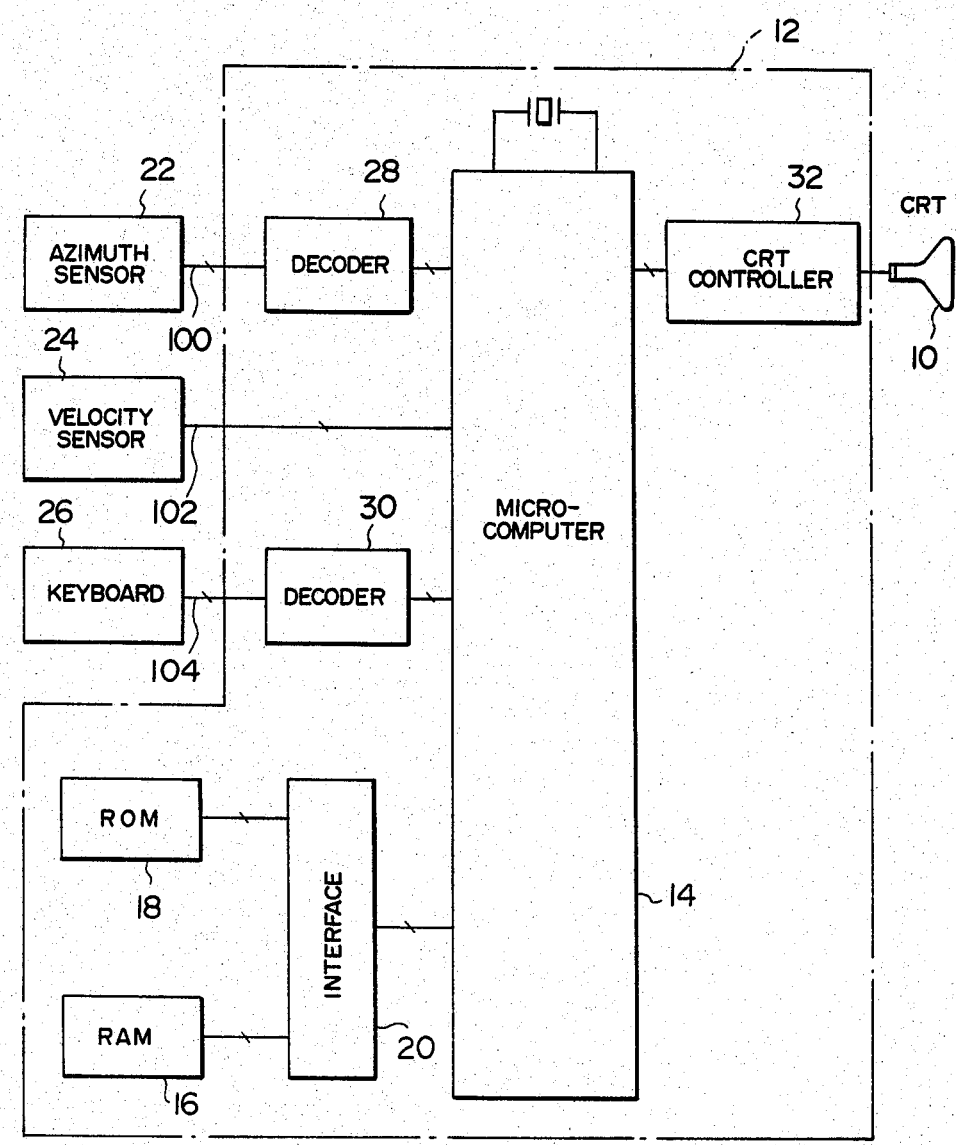
FIG. 1 shows a block diagram of one embodiment of the present invention.

FIG. 1 shows a preferred embodiment of the present invention. A CRT 10 for displaying a travel locus of a vehicle forms a display unit. A display control unit 12 for controlling the CRT 10 comprises a microcomputer 14 having a CPU, a ROM and a RAM, a RAM 16, a ROM 18 and an interface between the microcomputer 14 and the RAM 16 and the ROM 18. An azimuth sensor 22 for sensing an azimuth angle of the vehicle, a velocity sensor 24 as an travel distance sensor for sensing a travel distance of the vehicle and a keyboard 26 for supplying various instruction data including an azimuth data and a distance data to the microcomputer 14 are provided. A detection signal 100 from the azimuth sensor 22, a detection signal 102 from the velocity sensor 24 and the instruction data 104 from the keyboard 26 are supplied to the microcomputer through a decoder 28, directly and through a decoder 30, respectively. The CRT 10 is controlled by a CRT controller 32 which is driven by the microcomputer 14.

Figure 2:
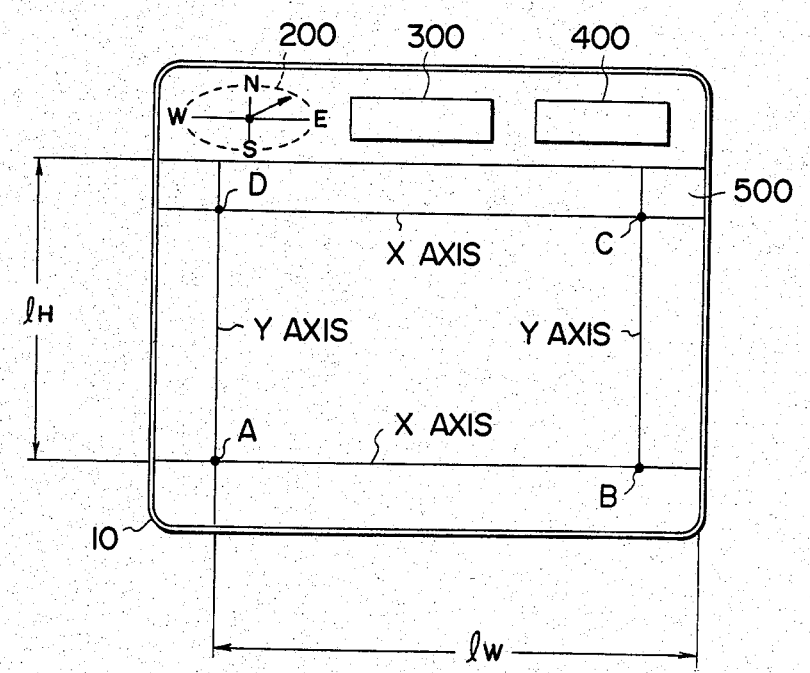
FIG. 2 illustrates a display screen of a CRT shown in FIG. 1.

FIG. 2 shows a display screen of the CRT 10 in the present embodiment. The display screen of the CRT 10 is divided into four areas. An upper left area is a travel azimuth display area 200, an upper middle area is a comment display area 300, an upper right area is a travel distance/remaining distance display area 400 and a lower area is a coordinate display area 500.

The travel azimuth display area display a travel azimuth of the vehicle. The upward direction of the CRT 10 is always set to the north and the travel azimuth of the vehicle is displayed by an arrow. This display is effected by the detection signal 100 from the azimuth sensor 22.

The comment display area 300 displays a distance of a selected section and other various comments. This display is effected by the instruction data 104 from the keyboard 26.

The travel distance/remaining distance display area 400 displays a travel distance of the vehicle from a start point and a remaining distance to a destination point.

The coordinate display area 500 displays coordinate axes X and Y and the start point, the destination point and the travel locus of the vehicle from the start point.

Figure 3:
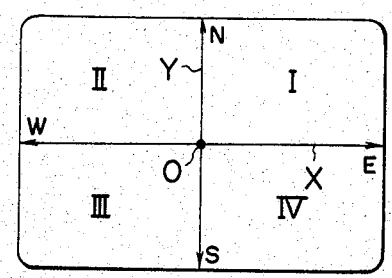
FIG. 3 illustrates a display quadrant.
Figure 4A:
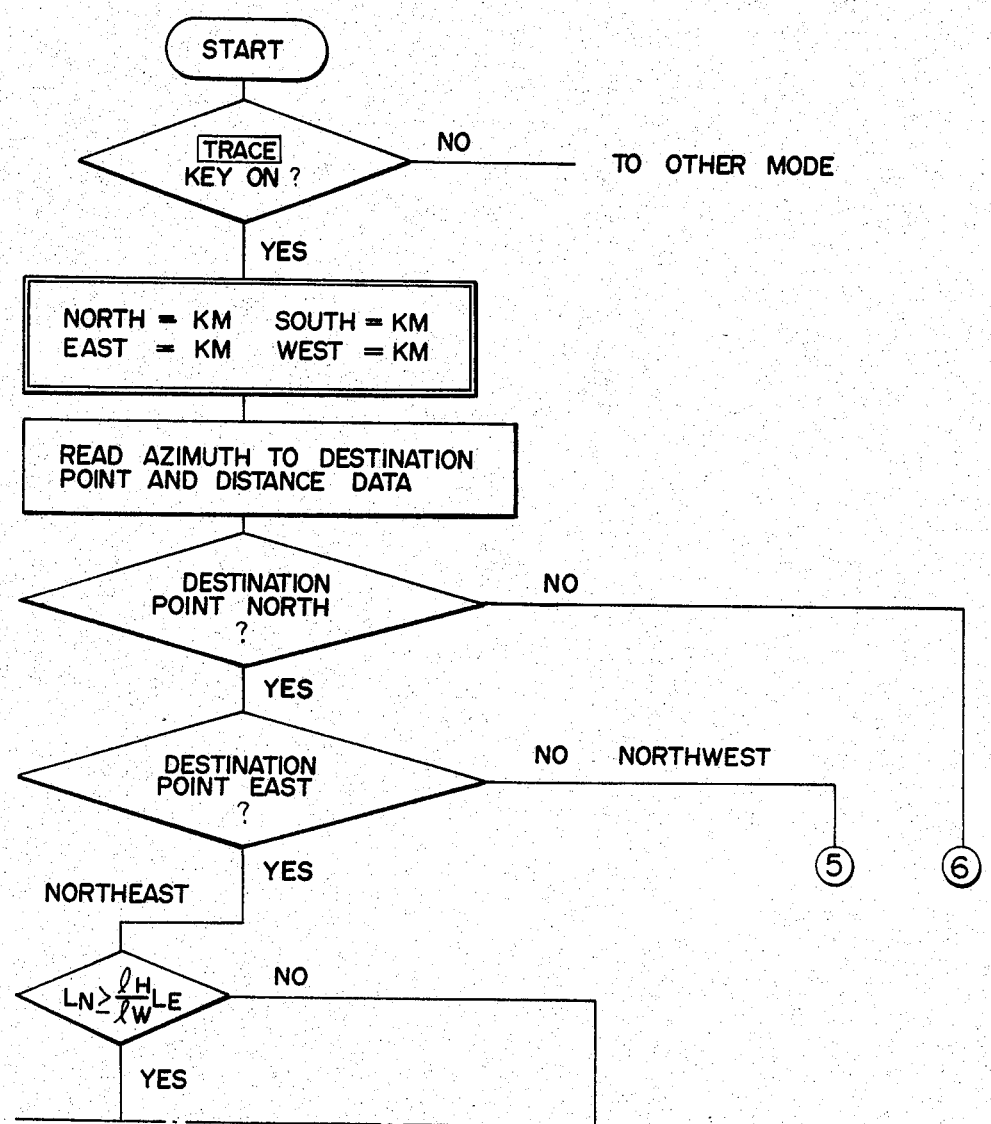
Figure 5:
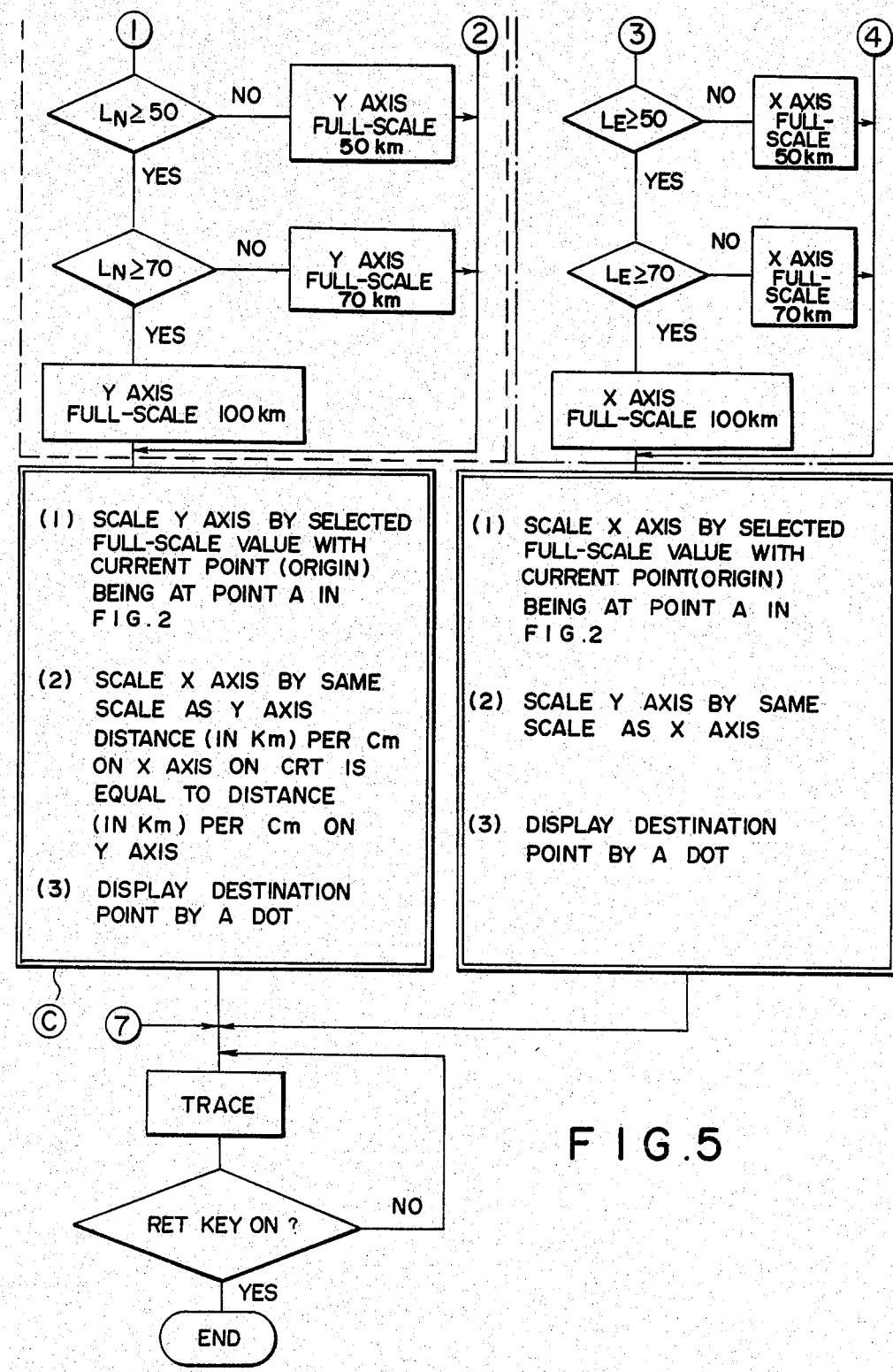
Figure 6:
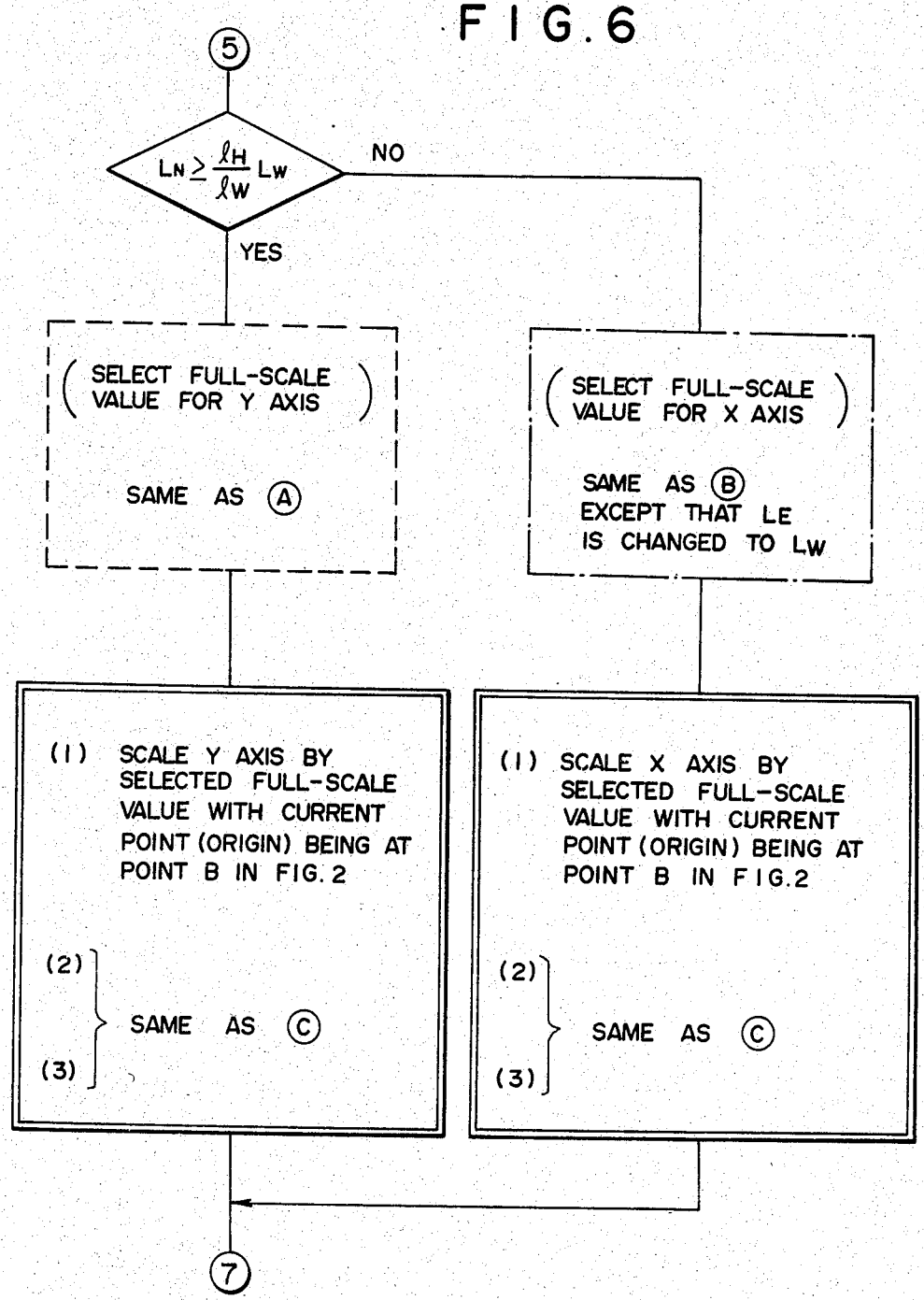
Figure 7:
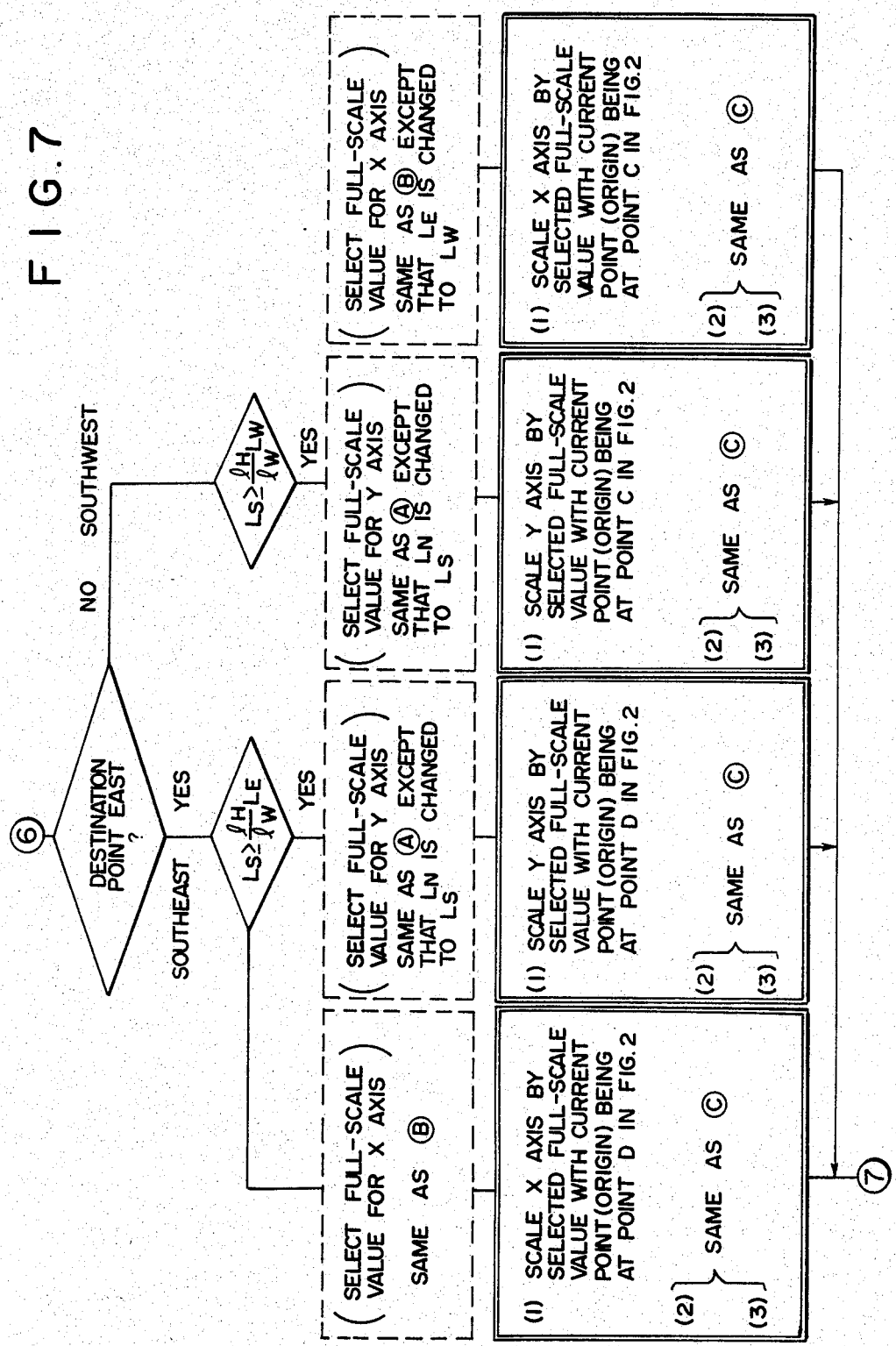

In the present invention, the manner of display of the coordinates on the coordinate display area 500 has been improved over that of the prior art. In the present invention, the display control unit 12 selects a display quadrant to which the destination point belongs based on the azimuth data to the destination point entered by the keyboard 26 to display the selected display quadrant on the coordinate display area 500. More specifically, referring to FIG. 3, the start point is set to an origin 0, the north direction is set to a positive direction on the Y axis and the east direction is set to a positive direction on the X axis. Thus, the destination point of the vehicle is in one of a first quadrant (I), a second quadrant (II), a third quadrant (III) and a fourth quadrant (IV) shown in FIG. 3. The quadrant to which the destination point belongs is selected as the display quadrant and displayed on the coordinate display area 500. The origin 0 when the first quadrant (I), the second quadrant (II), the third quadrant (III) or the fourth quadrant (IV) is selected is shown by A, B, C or D, respectively, in FIG. 2. Accordingly, when the destination point is in the quadrant (I), (II), (III) or (IV), the start point is displayed at point A, B, C or D, respectively.

In the present embodiment, the selected display quadrant is displayed over a substantially entire area of the coordinate display area 500 and portions of other three unselected quadrants which are adjacent to the display quadrant are contiguously displayed on the remaining area of the coordinate display area 500, as will be seen from FIG. 2. This prevents the travel locus from being not displayed in a special case other than when the vehicle travels in the selected quadrant, for example, when the vehicle detours and a dot indicating the vehicle position moves into the unselected quadrant.

In the present embodiment, the ROM 18 of the display control unit 12 stores a plurality of different scales for the X axis and the Y axis, and a maximum scale which allows the destination point to be displayed on the coordinate display area 500 is selected and displayed on the coordinate display area 500, as will be more specifically explained below.

In the present embodiment, the X axis and the Y axis have equal equiinterval scales having full-scale values of 1 Km, 3 Km, 5 Km, 10 Km, 15 Km, 20 Km, 50 Km and 100 Km. The full-scale values are prestored in the ROM 18 of the display control unit 12. When the keyboard 26 is operated to supply the azimuth data and the distance data to the microcomputer 14, the microcomputer 14 compares an absolute value of the distance to the destination point on the X axis with an absolute value thereof on the Y axis. (Since the X axis is longer than the Y axis as shown in FIG. 2, the distance to the destination point on the Y axis is multiplied by a predetermined factor.) The microcomputer 14 selects the larger one and compares it with the full-scale values for the corresponding axis sequentially, starting from the smallest full-scale value, and selects the full-scale value which first exceeds the absolute distance to the destination point to cause the X axis and the Y axis to be displayed on the coordinate display area 500 in accordance with the selected full-scale value.

In the present embodiment, a trace mode and a reverse retrace mode can be selected by the operation of the keyboard 26.

In the trace mode, a vehicle travel locus from the start point to the destination point is drawn and the locus is stored in the RAM 16 (or a magnetic tape) as required. In the reverse retrace mode, the stored locus is displayed on the CRT 10 and a reverse locus from the destination point to the start point or the locus from the start point to the destination point is displayed in superposition and the loci are stored as required.

The operation of the present embodiment thus constructed is now explained with reference to FIGS. 4, 5, 6 and 7.

First, a trace mode key on the keyboard 26 is operated to select the trace mode, and marks for indicating the entry of the distance data to the destination point and the azimuth data are displayed on the display screen of the CRT 10.

The keyboard 26 is then operated to supply the distance data and the azimuth data indicating $L_N$ Km to the north and $L_E$ Km to the east, to the computer 14. Then, the display control unit 12 selects the first quadrant (I) and selects the point A as the start point.

The microcomputer 14 compares $(lw/l_H) \times L_N$ with $L_E$, where $l_H$ is a length of the positive side on the Y axis and lw is a length on the positive side on the X axis. If the former is larger, the microcomputer 14 compares $L_N$ with the full-scale values for the Y axis sequentially, starting from the smallest one and selects the full-scale value which first exceeds $L_N$.

Then, the X axis and the Y axis having the origin 0 at the point A are displayed on the coordinate display area 500, with the Y axis being scaled by the selected full-scale value and the X axis being similarly scaled. The origin A is displayed by a dot and the destination point is also displayed by a dot. If $L_E$ for the X axis is larger, the Y axis is scaled equally to the X axis.

The device is thus ready to display the locus. As the vehicle starts to travel, the travel locus is displayed on the coordinate display area 500.

In the above example, the destination point is in the first quadrant (I). When the destination point is in the second quadrant (II), the third quadrant (III) or the fourth quadrant (IV), the corresponding quadrant is selected and the similar operation is carried out.

As described hereinabove, according to the present invention, the display quadrant to which the destination point belongs is displayed over a substantially entire area of the coordinate display area so that the exact travel locus of the vehicle can be displayed in an enlarged scale. By displaying the portions of other quadrants which are adjacent to the display quadrant on the remaining area of the coordinate display area, the travel locus can be displayed even if the vehicle moves off the display quadrant. By selecting the maximum scale coordinate which allows the destination point to be displayed in the display quadrant, more exact travel locus can be displayed.

It should be apparent to those skilled in the art that the above-described embodiment represents but one of many possible specific embodiments of the present invention. Numerous and varied other embodiments can be devised by those skilled in the art without departing from the spirits and scope of the present invention.

What is claimed is:

1. A travel locus display device comprising:
   a display unit such as CRT for displaying a destination point and a travel locus of a vehicle from a coordinate origin as a start point in a coordinate display area on a display screen;
   an azimuth sensor for sensing an azimuth of the vehicle;
   a travel distance sensor for sensing a travel distance of the vehicle; and
   a display control unit for controlling said display unit in accordance with an azimuth detection signal, a travel distance detection signal, an azimuth data and a distance data to the destination point supplied thereto, and for selecting one of four quadrants to which the destination point belongs based on said azimuth data, to cause said quadrant selected to be displayed over a substantially entire area of said coordinate display area and portion of other quadrants adjacent to said display quadrant to be displayed on the remaining area of said coordinate display area.

2. A travel locus display device according to claim 1 wherein said display control unit causes the travel locus of the vehicle to be displayed on the display screen of said display unit in accordance with said azimuth detection signal and said travel distance detection signal.

3. A travel locus display device according to claim 1 wherein said display control unit includes a RAM for storing travel locus data including said azimuth detection signal and said travel distance detection signal to cause the travel locus of the vehicle to be displayed on said display unit based on said travel locus data stored in said RAM in response to a trace signal from a data output unit for outputting various data.

4. A travel locus display device according to claim 1 wherein said display control unit includes a non-volatile memory which stores a plurality of coordinate data having different full-scale values.

5. A travel locus display device according to claim 4 wherein said display control unit selects a coordinate data of a maximum full-scale value which allows the destination point to be displayed in said display quadrant, based on said distance data to the destination point and causes the selected coordinate data to be displayed.

6. A travel locus display device according to claim 5 wherein said display control unit causes the travel locus of the vehicle to be displayed in a scale corresponding to the selected full-scale value of the coordinates.

7. A travel locus display device according to claim 1 wherein said display unit includes a display area for displaying a travel azimuth of the vehicle based on said azimuth detection signal.

8. A travel locus display device according to claim 1 wherein said display unit includes a display area for displaying a travel distance of the vehicle or a remaining distance to the destination point based on said travel distance detection signal.

* * * * *